United States Defensive Publication [19] (H) [11] T979,002

Akiyama et al. [43] Feb. 6, 1979

[54] OXYGEN CONCENTRATION DETECTOR

[75] Inventors: Yoshinori Akiyama, Kariya; Masami Ouki, Nagoya; Masatosi Suzuki, Kariya, all of Japan

[73] Assignee: Nippondenso Co., Ltd., Kariya, Japan

[21] Appl. No.: 886,591

[22] Filed: Mar. 14, 1978

[51] Int. Cl.[2] ..... G01N 27/58

[52] U.S. Cl. ..... 204/195 S

[57] ABSTRACT

An oxygen concentration detector of a waterproof construction comprises an oxygen ion conduction metal oxide (1) which produces an electromotive force in accordance with a difference between an oxygen concentration in gas component in a gas under test such as exhaust gas from an internal combustion engine of an automobile and an oxygen concentration in the atmosphere. The structure includes a coaxially arranged inner tube and an outer tube with the inner tube being housed in the outer tube with a water proof structure being interposed therebetween. The inner tube constitutes a lead wire to be electrically connected to that one of two electrodes for taking out the electromotive force which is created. The outer tube (18) serves to expose the inner electrode (2) to the atmosphere at a site such that water may not be splashed into the interior of the sensor.

4 Claims, 1 Sheet Drawing,

13 Pages Specification

The file of this unexamined application may be inspected and copies thereof may be purchased (849 O.G. 1221, Apr. 9, 1968).

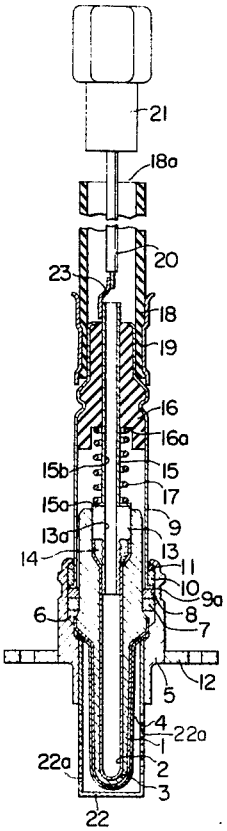

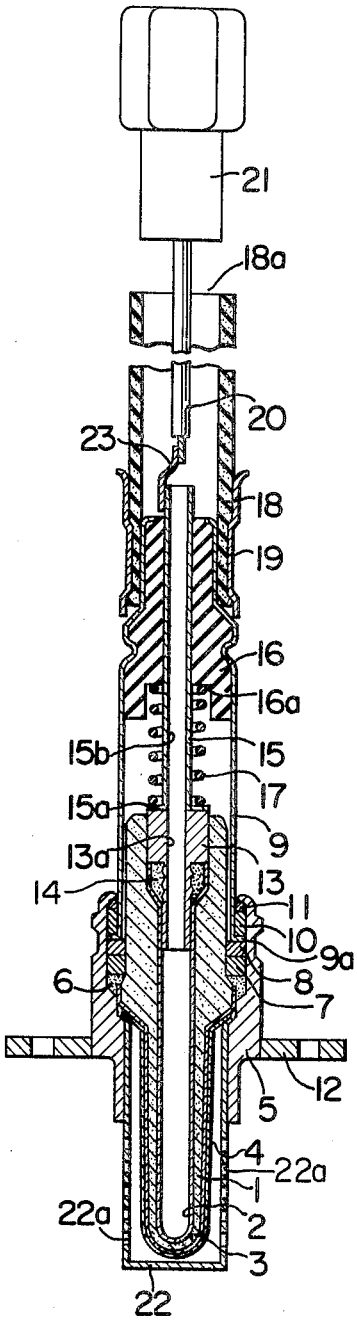
21
18a
20
23
18
19
16
16a
15b
15
17
15a
9
13a
13
14
11
10
9a
6
8
7
12
5
4
22a
1
22a
2
3
22